W. F. JACOBS.
FEED AND LITTER CARRIER.
APPLICATION FILED JUNE 5, 1909.
981,272.
Patented Jan. 10, 1911.
2 SHEETS—SHEET 1.
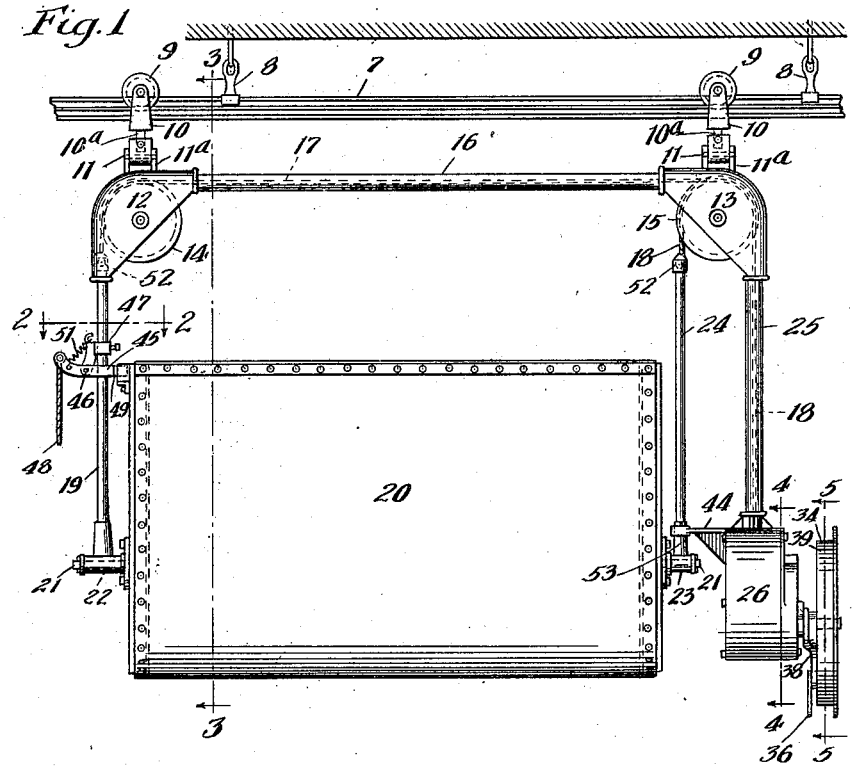
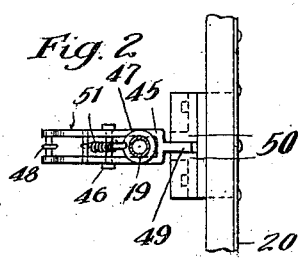
Witnesses:
Wm. Geiger
Inventor:
William F. Jacobs
By Munday, Evarts, Adcock & Clarke
Attorneys

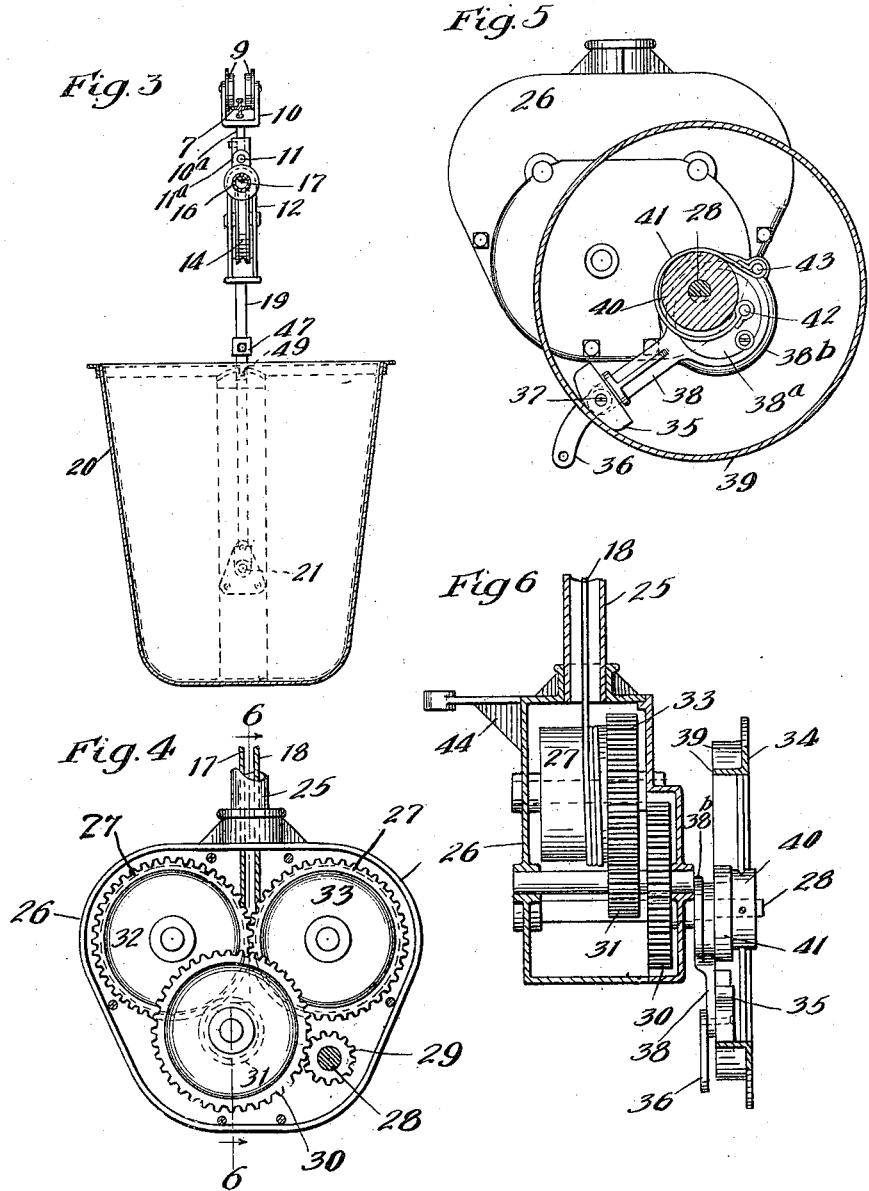

UNITED STATES PATENT OFFICE.

WILLIAM F. JACOBS, OF OTTAWA, ILLINOIS, ASSIGNOR TO J. E. PORTER COMPANY, OF OTTAWA, ILLINOIS, A CORPORATION OF ILLINOIS.

FEED AND LITTER CARRIER.

981,272. Specification of Letters Patent. Patented Jan. 10, 1911.

Application filed June 5, 1909. Serial No. 500,393.

*To all whom it may concern:*

Be it known that I, WILLIAM F. JACOBS, a citizen of the United States, residing in Ottawa, in the county of Lasalle and State of Illinois, have invented a new and useful Improvement in Feed and Litter Carriers, of which the following is a specification.

This is an improvement in feed and litter carriers adapted to be used in carrying the litter from stables and in conveying the food to the live stock.

The carrier used by me is supported from an elevated track and is provided with means whereby it may be raised and lowered, and is mounted on trunnions so it may be tipped to dump its contents, and it is also provided with releasable means whereby it may be locked in an upright position.

The invention relates more particularly to the means for raising and lowering the carrier, and their nature is fully set forth below and also illustrated in the accompanying drawing in which—

Figure 1 is a side elevation of the invention; Figs. 2, 3, 4 and 5 are sections on the lines 2—2, 3—3, 4—4 and 5—5 respectively of Fig. 1; Fig. 6 is a section on the line 6—6 of Fig. 4.

In said drawing 7 represents a familiar form of track adapted to be used in hay carriers and also well adapted for litter and feed carriers. It is adapted to be suspended wherever needed by hangers 8 and to receive the rollers 9 supporting the carrier 20 and pivoted to the arms of a U-shaped piece 10, from which depends connection 10$^a$, surrounding the pivot of a swivel joint 11 allowing the swinging of the carrier laterally from the plane of the track in order to enable it to avoid obstructions. The pivot of the swivel joint 11 is given bearings in ears 11$^a$ cast upon the sheave housings 12 and 13, and in such housings are pivoted sheaves 14 and 15. Of these the sheave 14 has a single groove and the sheave 15 has two grooves. The housings are spaced apart and also connected rigidly together by a section of pipe 16 large enough to permit the free passage through it of the cable 17 by which one end of the carrier is raised and lowered. Cable 17 extends downward from sheave 14 to a pipe 19 by which it is joined to the trunnion 21 upon the litter or feed carrier 20. The hopper is provided at each end with trunnions 21, turning in bearings 22 and 23, one supported by the pipe 19 and the other by a similar pipe 24 at the other end of the carrier. A second cable 18 is employed to support the other end of the carrier and it extends from the pipe 24 to a junction with the carrier. Cable 17 moves from the sheave 14, as will be understood, and thence through the pipe 16 to sheave 15 and thence down through a pipe 25 to a gear-box 26 containing two drums on which the cables 17 and 18 are wound. These drums are both indicated in dotted lines in Fig. 4 and one of them is shown in full lines in Fig. 6. Cable 18 passes over the sheave 15 and thence through the pipe 25 to the drum 27 in gear box 26.

The gear-box 26 contains an operating shaft 28 carrying a pinion 29 meshing with the gear 30, and on the shaft of the gear 30 is a pinion 31 meshing with the gear 32 which in turn drives the gear 33. The gear 32 carries the drum which receives cable 17, and the gear 33 carries the drum 27 upon which cable 18 is wound. For operating these gears a hand wheel 34 is mounted upon shaft 28, and affords a means whereby the attendant may wind up the cables and raise the carrier to any height desired. This hand wheel 34 is provided with means whereby the attendant may control the height of the carrier. These means consist of a brake shoe 35 attached to a handle 36 pivot at 37 to a rigid arm 38 having a ring 38$^b$ freely encircling the stationary boss 38$^a$. The handle 36 being pivoted to the arm 38 permits the attendant when he wishes to lock the gearing to do so by turning the handle so as to bring the shoe forcibly against the rim 39 of the hand wheel. As a means of controlling the speed of the carrier in descending I place around the hub 40 of the hand wheel, a friction band 41 and secure one end of said band to a pin 42 inserted in the boss 38$^a$ and attach the other end to a pin 43 secured in the ring 38$^b$. With this insertion it will be seen that when the handle 36 is moved in one direction so as to carry the arm 38 with it, it will tend to tighten the band 41 upon the hub 40 and that when the handle is moved in the other direction it will loosen the band 41. The gear-box is rigidly joined to the pipe 24 by a bracket 44.

For the purpose of locking the carrier against tipping on its trunnions 21 I provide upon the pipe 19 a latch 45 pivoted at 46 to the arm of the collar 47 secured on the pipe. A cable 48 is attached to the outer end of the latch and by pulling upon it, the other end 49 of the latch is raised from its engagement with the lips 50, 50, bolted to the end of the hopper. A spring 51 tends to keep the latch in engaging position, but when the latch is released, the carrier will turn on its trunnions and dump its load automatically. The hand wheel enables the attendant to maintain the carrier at the necessary height while it is being filled and moved along the tracks, and the latch 45 maintains it in the upright position.

Both the pipes 19 and 25 are rigidly attached to the sheave housings and the housings being rigidly spaced apart and also secured together, it will be seen that a stiff rigid frame is formed in which are located the cables and their operating devices, and this frame forms the connection between the two sets of rollers upon the track and the carrier, and maintains the rollers at a uniform distance from each other.

I connect the cables 17 and 18 to the pipes 19 and 24 respectively by couplings 52 made tapering at the top. I also provide the bottom of pipe 24 with a tapering cap 53 adapted to enter the bracket 44 and to fit snugly therein when the carrier is raised so that the carrier may be rigidly held against endwise play which would be objectionable because it is liable to cause the spilling of the contents of the carrier.

I claim:—

1. The combination with the carrier supported by rollers from an elevated track, of separate cables for raising and lowering the carrier, said cables being attached one at each end of the carrier, separate drums for said cables, and actuating mechanism operating said drums in unison, said drums and their actuating mechanism being arranged in a gear box 26.

2. The combination of a litter or feed carrier with an elevated track from which the carrier is supported and along which it moves, of supporting rollers, cables for raising and lowering the carrier, a rigid frame connected to the rollers and forming ways covering the cables, winding drums and actuating mechanism for operating the cables, and a brake for controlling said drums.

3. The combination of a litter or feed carrier with an elevated track from which the carrier is supported and along which it moves, of supporting rollers, separate cables one for each end of the carrier, whereby it is raised and lowered, a rigid frame containing ways covering the cables, winding drums operating the cables and actuating mechanism therefor, and a brake for controlling the drums.

4. The combination of a litter or feed carrier with an elevated track from which the carrier is supported and along which it moves, of supporting rollers, cables for raising and lowering the carrier, a rigid frame connected to the rollers and having sheaves and ways covering the cables, winding drums and actuating mechanism for operating the cables, and a brake controlling said drums.

5. The combination with the carrier, the elevated track on which it travels, the cables for raising and lowering the carrier, and the winding drums on which the cables are wound, of a hand wheel geared to the drums serving as a means for actuating them when raising the carrier, a gear box in which the drums and gearing are inclosed, and a brake shoe and lever acting to control the hand wheel.

6. The combination with the carrier, the elevated track on which it travels, the cables for raising and lowering the carrier, and the winding drums on which the cables are wound, a hand wheel geared to the drums serving as a means for actuating them when raising the carrier, and a friction band adapted to be tightened upon the hub of said wheel, and a lever for causing such tightening.

WILLIAM F. JACOBS.

Witnesses:
 GLENN SHULER,
 RODNEY C. GLOVER.